July 11, 1933.　　　W. W. WEBER　　　1,917,621
TRUCK MOUNTED ELEVATOR
Filed Oct. 22, 1930　　　3 Sheets-Sheet 1
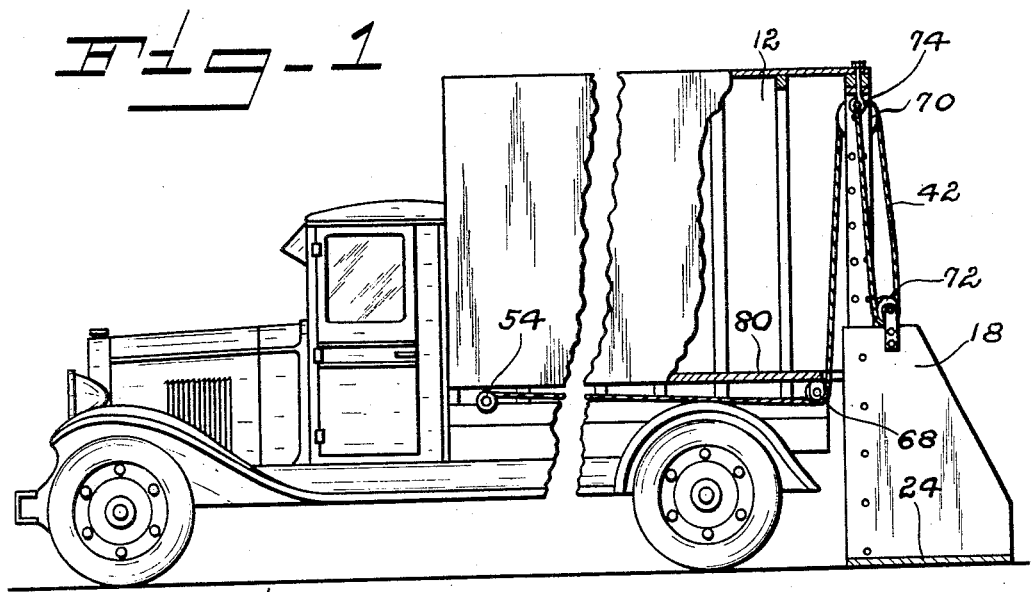
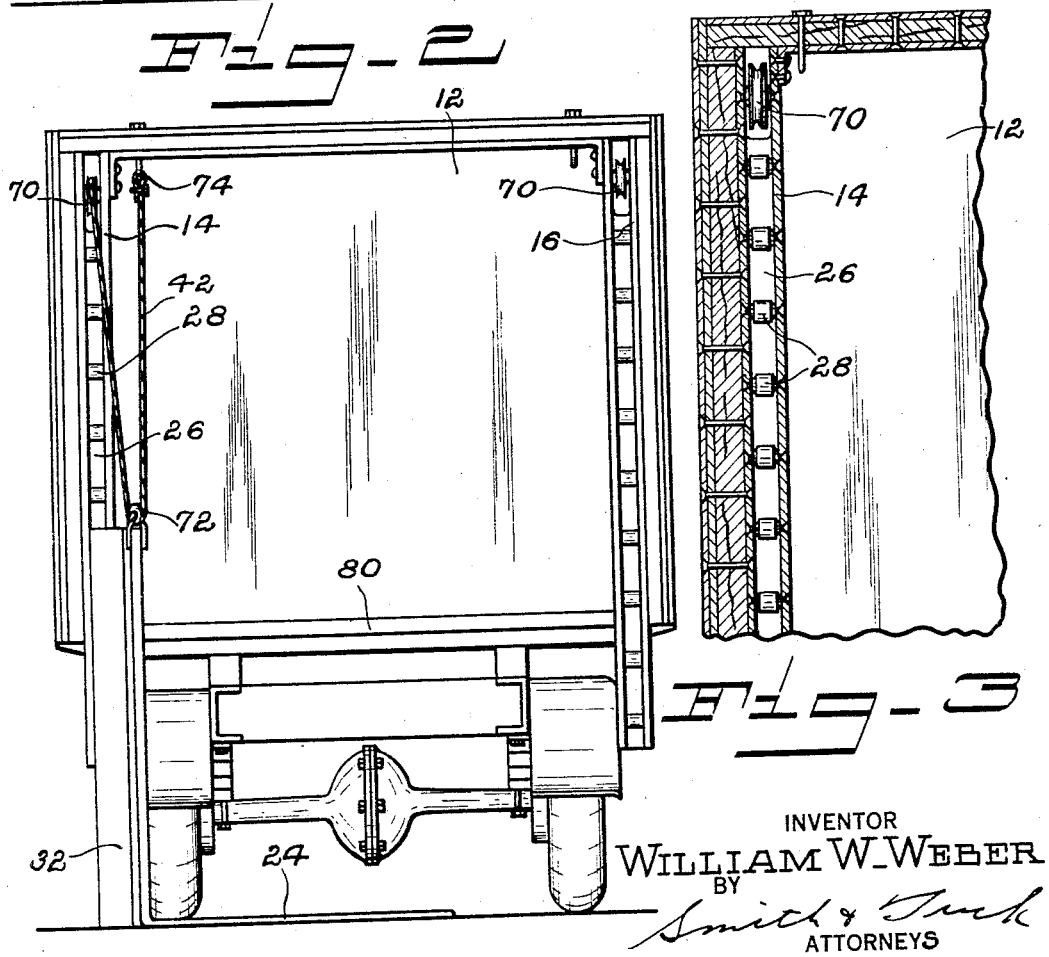
INVENTOR
WILLIAM W. WEBER
BY
ATTORNEYS

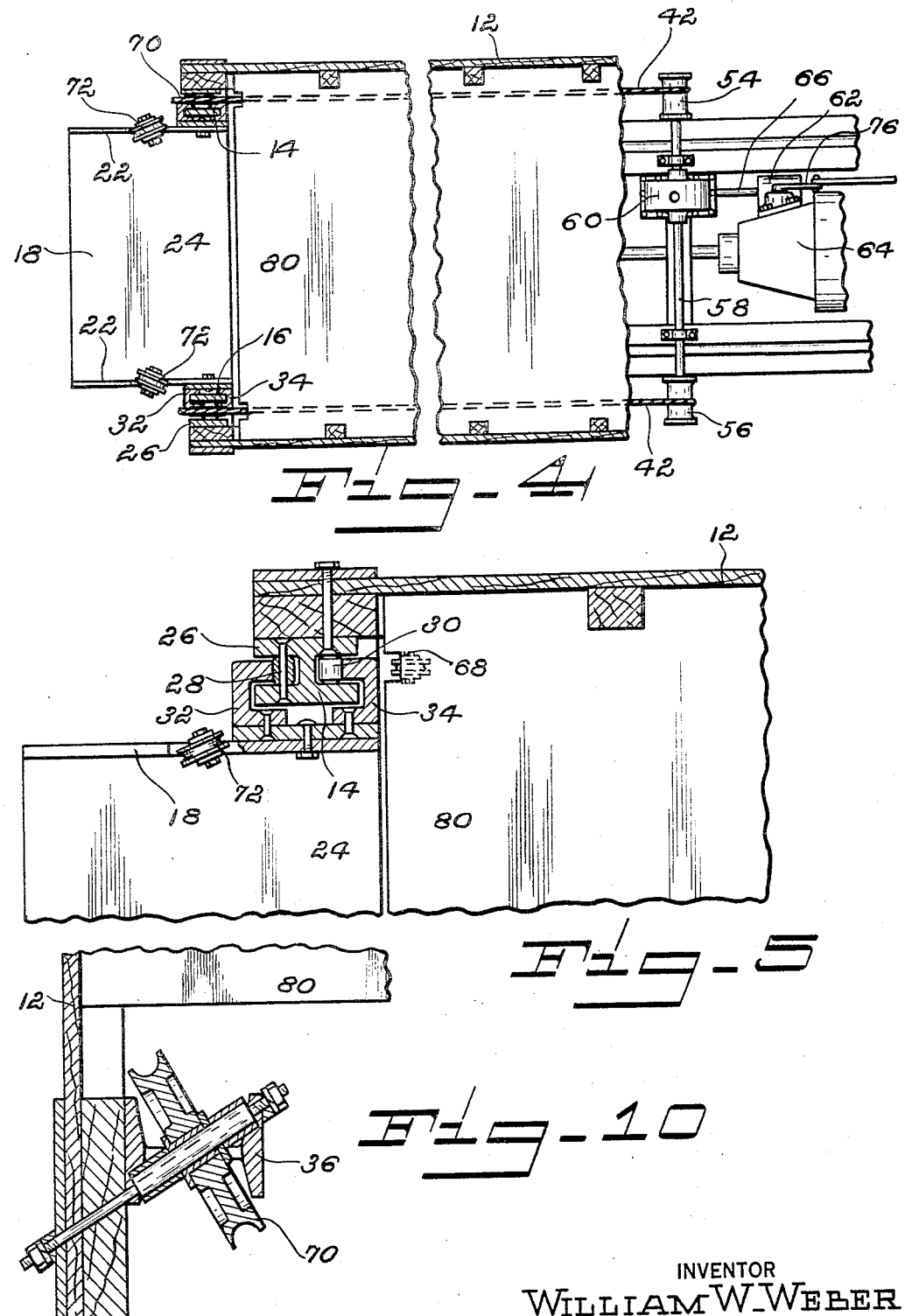

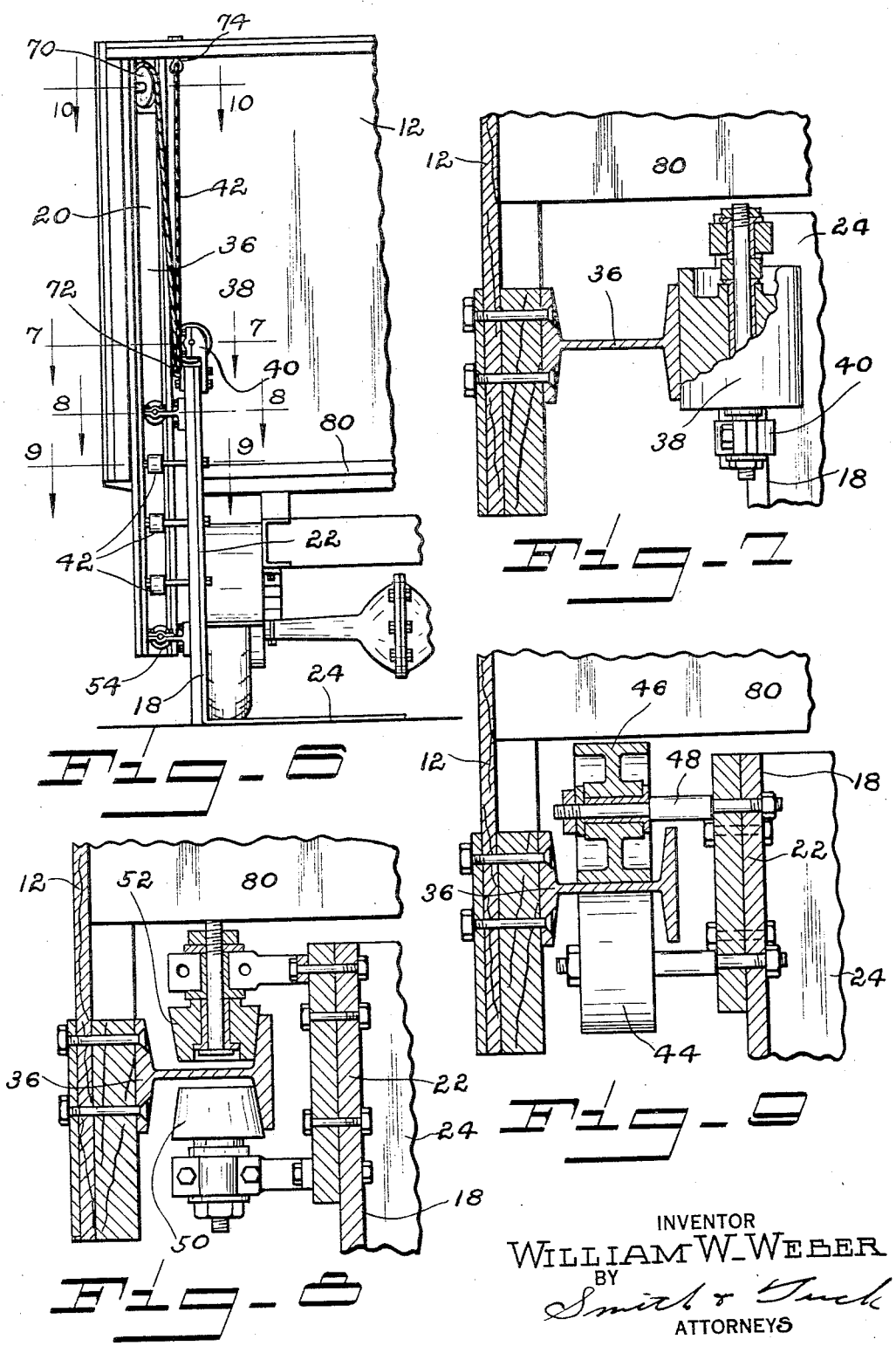

Patented July 11, 1933

1,917,621

UNITED STATES PATENT OFFICE

WILLIAM W. WEBER, OF SEATTLE, WASHINGTON

TRUCK MOUNTED ELEVATOR

Application filed October 22, 1930. Serial No. 490,341.

My present invention relates to the art of automobile trucking and more particularly to a truck mounted elevator.

Of recent years freight transportation has been running more and more to the use of trucks. It has been found that in particularly the short truck hauls more time is often spent in loading and unloading a truck than is consumed in the actual movement of the same. Further, trucks of practically all capacities have recently found it very advantageous to use pneumatic tire equipment. This has made it necessary to raise the floor level of the truck body if it is desired to have a full width body, which is mandatory in many cases. A full width body requires that the body must extend out over the wheels and that further there must be sufficient clearance between the floor and the wheels to take care of the spring deflection when the truck is loaded, and also shock loading such as occurs when a wheel strikes a rut and produces an unusual spring deflection. With the advent of pneumatic tires the floor level has been raised and the problem of loading the truck has been accordingly increased. It is to supply means to assist in the loading of such trucks that I have conceived and developed my present invention. Therefore:

The principal object of my invention is to provide means for economical loading of automobile trucks.

A further object is to provide means for picking up goods from the ground level and raising them to the level of the truck floor, or lowering them in unloading.

Other and more specific objects will be apparent from the following description taken in connection with the accompanying drawings, wherein:

Figure 1 is a side elevation of an automobile truck equipped with my elevator, certain parts of the view being broken away and shown in section to better illustrate the construction.

Figure 2 is a rear end view of a truck with my elevator in place excepting that I have removed or broken away one-half of the elevator to more completely show the roller assembly.

Figure 3 is an enlarged fragmentary view showing the upper left hand corner of Figure 2.

Figure 4 is a fragmentary view with certain parts broken away to show in general the operating means for my elevator.

Figure 5 is an enlarged sectional view of the upper left hand corner of Figure 4.

Figure 6 is a fragmentary view similar to Figure 2 showing just one-half of the truck and using a modified form of elevator guide means.

Figure 7 is a sectional view along the line 7—7 of Figure 6.

Figure 8 is a cross-sectional view along the line 8—8 of Figure 6.

Figure 9 is a cross-sectional view along the line 9—9 of Figure 6.

Figure 10 is a cross-sectional view along the line 10—10 of Figure 6.

Referring to the drawings throughout which like reference characters indicate like parts, numeral 12 designates a truck body of conventional type. I have shown a covered body. This is a desirable form but it is to be understood that my elevator will work equally well with a platform body. Secured at the rear end the opposite sides are guide members 14 and 16 respectively. At this point I believe it will be apparent that one of two forms might be employed to guide my elevator proper 18. In general this might be a form as shown in Figures 2 and 3 wherein the guide rollers are fixed within guide members 14 or 16, or might be of the form shown in Figure 6 where the rollers themselves are secured to the elevator body 18 and run in suitable guide members 20. The latter case is at present most preferred by me although I wish it understood that I consider one the mechanical equivalent of the other inasmuch as the elevator itself is in both instances mounted to slide on the rollers to the end of reducing friction.

The elevator proper 18 is composed of two end members 22 and a floor member 24 suitably bound together as by riveting or welding, so as to make a substantial frame-work. It must be remembered that at times loads of two or three tons may be placed upon the elevator and the construction must, therefore, be very substantial. In the form shown in Figure 2 I prefer to use an H section 26 which is fixedly secured to the end of the truck body in a vertical position with one such member on each side, as indicated in general by the numerals 14 and 16. Spaced at intervals are rollers 28 and 30, which are journaled on pins which are secured in the legs of the H section 26. Arranged to bear on these rollers are the channel members 32 and 34, which in turn are fixedly secured to the elevator body 18.

In the form shown in Figures 6, 7, 8 and 9 I have found it most convenient to use an I beam member as 36 secured to each side of the truck body. Adapted to engage the I beam are several rollers, the first of which is shown in detail in Figure 7, as the roller 38, which is suitably journaled in a cast member 40, which in turn is secured to the side frames of the body 18. This roller is provided to take care of principally any side thrust which may come upon the side members, due to the pulling action of the elevator cable 42. To provide against any canting action due to the loading of the elevator body, I have provided a plurality of rollers. For the sake of completeness and strength I prefer to have two such rollers adapted to engage both sides of the I beam web as the rollers 44 and 46. These are mounted on suitable bearings and fixedly secured as by the journal bolts 48 to the elevator body 18, or more properly to the side members 22 of the same.

Now, I have found when a truck is being loaded it rarely sets in a level position. To prevent any binding of the elevator in its guides due to this inclination I have provided additional rollers 50 and 52, which operate in a plane parallel to roller 38, and at right angles to the plane of rollers 44 and 46. This construction is more clearly shown in Figure 8 although there are two sets of this construction, one at the upper end of member 22 and one at the lower end, designated at 54. These rollers are provided with suitable bearings and fixedly secured to member 22.

As the primary use of this device is an elevator it is necessary to provide means for lifting the elevator and its load. Now, any suitable means might be employed for this purpose. In some instances I have found that an electric motor may be direct-connected to suitable means. This is quite satisfactory where trucking is between terminal stations where current for operating the electric motor will be readily available. In most instances, however, I find it desirable to have the elevator operated by the motive power of the truck itself.

In the truck motor we have a source of power which is always available and which can supply the reasonably large amount of power such a device as this needs if it is going to operate quickly. To this end I provide cable drums 54 and 56, which are mounted upon a drive shaft 58. This shaft has mounted thereupon a worm gear indicated as within the housing at 60, and which is driven by an intermeshing worm, also within the same housing. This provides a self locking arrangement so that no auxiliary brakes or the like are necessary and it also provides for easy attachment to the transmission of the truck. This is accomplished by the standard type of power take-off indicated at 62 as secured to the side of the transmission case 64. This equipment is well developed, being supplied by a number of manufacturers, and, of course, supplies no part of this invention. A connecting shaft 66 is provided to connect the power take-off and the driving worm. Drums 54 and 56 are provided of sufficient capacity to wind up the amount of cable required to raise elevator 18. The cable 42 is led around by sheave 68, and upper sheave 70. This upper sheave may be as shown in Figures 2 and 3, or as I now most prefer it, to be set diagonally as indicated in Figures 6 and 10. Cable 42 then may be attached directly to the body 18. This would be the form used for handling light loads. If heavy loading is to be handled, however, it would be desirable to employ another sheave or pulley at 72 and anchor the end of the cable as at 74, this giving an additional two to one mechanical advantage.

Method of operation

When it is desired to use my device for the loading, for instance, of sacked material a hand truck loaded with five or six sacks would be pushed onto the elevator. The truck operator then, through suitable linkage, would engage the lever 76 and thus raise the elevator with the hand truck, its load of material and its operator, up until the floor 24 of the elevator is at the same elevation as the floor 80 of the truck, or to a higher level for a second tier. The operator would then push his truck load of material into the desired position, remove his hand truck from underneath the same, take his position upon the elevator and be lowered to the ground level again preparatory to obtaining a new load.

This greatly facilitates handling of freight where loading platforms have not been arranged to suit the exact height of the truck being loaded. In many cases it entirely obviates the need of cranes for loading. Also it permits loading of heavy articles which the enclosed top of truck does not permit being loaded with a crane. I have found my truck elevator particularly useful in loading roll materials, such as paper, drums of oil and the like, which may be rolled upon the elevator floor 24, quickly raised to the level of floor 80 and rolled into position.

I appreciate that elevators of various types have been constructed for so long as to leave but little novelty in the mechanical construction thereof. I feel, however, that in limiting my present application to the use of my device as applied to a truck that I have provided a device which performs an entirely new function, which makes possible certain operations that could not be performed with former equipment and feel when used in combination with the truck it is a very great time-saver.

The foregoing description and the accompanying drawings are believed to clearly disclose a preferred embodiment of my invention but it will be understood that this disclosure is merely illustrative and that such changes in the invention may be made as are fairly within the scope and spirit of the following claim:

What I claim is:

In a truck elevator, the combination with a pair of spaced, upright, I-beams fixed to the truck, of an elevator platform having side frames adjacent the I-beams, a set of rollers journaled on the side frames and engaging the opposite sides of the web of the I-beam, sets of rollers journaled on the side frames having frictional engagement with the inner faces of the inner flanges of the beams, sets of rollers journaled on the side frames at opposite sides of the I-beam and engaging the outer faces of the inner flanges of said beams, and means for operating the elevator.

In witness whereof, I have hereunto subscribed my name this 1st day of October A. D. 1930.

WILLIAM W. WEBER.